(12) United States Patent
Thon

(10) Patent No.: US 11,463,849 B2
(45) Date of Patent: Oct. 4, 2022

(54) DATA PROCESSING DEVICE, DATA ANALYZING DEVICE, DATA PROCESSING SYSTEM AND METHOD FOR PROCESSING DATA

(71) Applicant: SIEMENS AKTIENGESELLSCHAFT, Munich (DE)

(72) Inventor: Ingo Thon, Grasbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/650,107

(22) PCT Filed: Sep. 18, 2018

(86) PCT No.: PCT/EP2018/075191
§ 371 (c)(1),
(2) Date: Mar. 24, 2020

(87) PCT Pub. No.: WO2019/063361
PCT Pub. Date: Apr. 4, 2019

(65) Prior Publication Data
US 2020/0228945 A1    Jul. 16, 2020

(30) Foreign Application Priority Data

Sep. 28, 2017   (EP) .................................. 17193654

(51) Int. Cl.
*H04W 4/38* (2018.01)
*G06F 16/9035* (2019.01)
(Continued)

(52) U.S. Cl.
CPC .......... *H04W 4/38* (2018.02); *G06F 16/9035* (2019.01); *G06F 17/18* (2013.01); *H04L 67/125* (2013.01)

(58) Field of Classification Search
None
See application file for complete search history.

(56) References Cited

U.S. PATENT DOCUMENTS

| 6,085,183 A | 7/2000 | Horn et al. | |
| 2003/0140039 A1* | 7/2003 | Ferguson | ........... G06K 9/00503 |

(Continued)

FOREIGN PATENT DOCUMENTS

| CN | 1178016 A | 4/1998 |
| CN | 104144204 A | 11/2014 |

(Continued)

OTHER PUBLICATIONS

International Search Report and the Written Opinion for International Patent Application PCT/EP2018/075191 dated Nov. 7, 2018.

*Primary Examiner* — William G Trost, IV
*Assistant Examiner* — Christopher P Cadorna
(74) *Attorney, Agent, or Firm* — Lempia Summerfield Katz LLC

(57) ABSTRACT

The present disclosure provides an enhanced computation of a data model for an intelligent data processing device. The data processing device may be a device having limited computational resources. Accordingly, a system model for processing the data is computed in the local device. Additionally, an enhanced model may be computed in a remote device like a cloud or a data center. For this purpose, the cloud or datacenter is provided with filtered data for computing an enhanced model. The cloud or datacenter may compute an enhanced model and forward the respective model to the local device if the enhanced model is better than the model locally generated.

13 Claims, 2 Drawing Sheets

| 10 | Data processing device | 20 | Datacenter |
| 11 | Sensor database | 21 | Sensor database |
| 12 | Model database | 23 | First model generator |
| 13 | Model generator | 24 | Second model generator |
| 14 | Controller | 25 | Data analyzer |
| 15 | Data filter | 26 | Receiver |
| 16 | Receiver | | |
| 19 | Sensor | | |

(51) Int. Cl.
 *G06F 17/18* (2006.01)
 *H04L 67/125* (2022.01)

(56) References Cited

U.S. PATENT DOCUMENTS

| | | |
|---|---|---|
| 2014/0337000 A1 | 11/2014 | Asenjo et al. |
| 2015/0169795 A1* | 6/2015 | ElBsat ................. G06Q 50/06 703/2 |
| 2015/0186777 A1 | 7/2015 | Lecue |
| 2015/0371151 A1 | 12/2015 | Georgescu et al. |
| 2016/0110478 A1* | 4/2016 | Aggour ................. G06F 17/40 707/755 |
| 2017/0307393 A1* | 10/2017 | Kobayashi ............. G01C 21/26 |
| 2018/0356809 A1* | 12/2018 | Trainor ................ H04W 84/18 |
| 2019/0370687 A1* | 12/2019 | Pezzillo ................ G06N 20/00 |

FOREIGN PATENT DOCUMENTS

| | | |
|---|---|---|
| CN | 106796577 A | 5/2017 |
| WO | WO2016172316 A1 | 10/2016 |

\* cited by examiner

| 10 | Data processing device | 20 | Datacenter |
| 11 | Sensor database | 21 | Sensor database |
| 12 | Model database | 23 | First model generator |
| 13 | Model generator | 24 | Second model generator |
| 14 | Controller | 25 | Data analyzer |
| 15 | Data filter | 26 | Receiver |
| 16 | Receiver | | |
| 19 | Sensor | | |

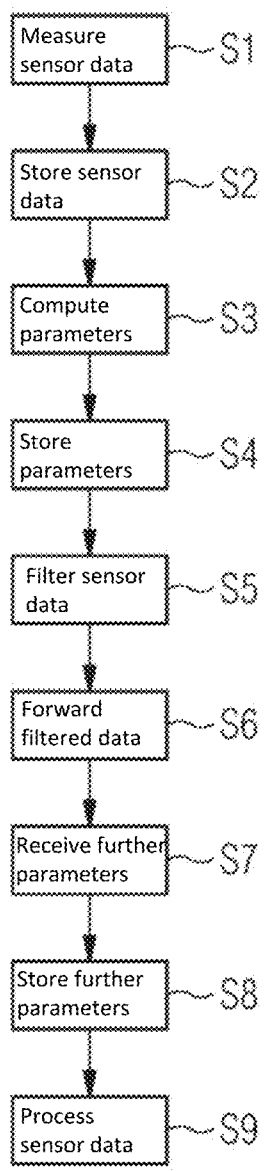

DATA PROCESSING DEVICE, DATA ANALYZING DEVICE, DATA PROCESSING SYSTEM AND METHOD FOR PROCESSING DATA

The present patent document is a § 371 nationalization of PCT Application Serial No. PCT/EP2018/075191, filed Sep. 18, 2018, designating the United States, which is hereby incorporated by reference, and this patent document also claims the benefit of European Patent Application No. 17193654.5, filed Sep. 28, 2017, which is also hereby incorporated by reference.

TECHNICAL FIELD

The present disclosure relates to a data processing device, a data analyzing device, a data processing system, and a method for processing data.

BACKGROUND

U.S. Patent Application Publication No. 2016/0110478 A1 relates to blocking and featurization of time-series data gathered from at least one sensor. The input time-series data is divided into blocks with common attributes (e.g., features) according to feature models that describe patterns in the data. The blocks may be overlapping or non-overlapping. The resultant feature blocks are annotated with feature information and semantic meaning.

Although applicable in principle to any data processing system employing a data model, the present disclosure and its underlying problem will be described hereinafter in combination with an industrial system processing sensor data which are locally acquired.

An intelligent control of an industrial system requires devices which may improve automatically their performance over time. For example, local devices perceive their environments by measuring data and automatically determine an appropriate action based on the measured data. In order to optimize the system, machine learning may be employed on the controllers of the local devices. However, due to limitations of the devices the machine learning on the local devices is also limited, for instance by the available memory, the computational power or the energy consumption. Cloud infrastructures like Siemens Mindsphere may have large amounts of available resources. Accordingly, these resources enable enhanced machine learning. However, to perform this enhanced machine learning, data from the local devices have to be provided to the cloud infrastructure, the machine learning has to be performed in the cloud infrastructures and successively, the results of the machine learning have to be transmitted back to the local devices. Accordingly, a huge amount of data has to be transferred between the local devices and the cloud.

Against this background, a problem addressed by the present disclosure is to provide a smart machine learning. Especially, the present disclosure aims to provide an improved generation of parameters for a data processing model in the environment of locally distributed devices.

SUMMARY

The scope of the present disclosure is defined solely by the appended claims and is not affected to any degree by the statements within this summary. The present embodiments may obviate one or more of the drawbacks or limitations in the related art.

The present disclosure provides a data processing device, a data analyzing device, a data processing device, and a method for processing data.

In a first aspect, a data processing device is provided, wherein the data processing device includes a sensor database, a model database, a controller, a model generator, a data filter, and a receiver. The sensor database is configured to store sensor data measured by a number of sensors. The model database is configured to store model parameters of a system model. The controller is configured to process the sensor data measured by the number of sensors. For example, the sensor data are processed based on model parameters stored in the model database. The model generator is configured to compute model parameters of the system model based on the sensor data stored in the measurement database. The model parameters are computed by applying a first model scheme. The computed model parameters of the system model are stored in the model database by the model generator. The data filter is configured to filter the sensor data stored in the sensor database. Further, the data filter is configured to forward the filtered sensor data to an external data analyzing device. The receiver is configured to receive further model parameters provided by the external data analyzing device. The receiver is further configured to store the received further model parameters in the model database of the data processing device.

In a second aspect, a data analyzing device is provided. The data analyzing device includes a receiver, a sensor database, a first model generator, a second model generator, and a data analyzer. The receiver is configured to receive sensor data from an external data processing device. The sensor database is configured to store the received sensor data. The first model generator is configured to compute first model parameters of a system model. The first model parameters are computed based on the sensor data stored in the sensor database by applying a first model scheme. The second model generator is configured to compute second model parameters of the system model. The second model parameters are computed by the second model generator based on the sensor data stored in the sensor database by applying a second model scheme. The data analyzer is configured to compare the first model parameters with the second model parameters. Further, the data analyzer is configured to send the second model parameters to the data processing device if a difference between the first model parameters and the second model parameters exceeds a predetermined threshold.

In a third aspect, a data processing system is provided. The data processing system includes a data processing device according to the first aspect and a data analyzing device according to the second aspect.

In a fourth aspect, a method for processing data is provided. The method includes the acts of measuring sensor data; storing measured sensor data in a sensor database of a data processing device; computing, in the data processing device, online model parameters of a system model based on sensor data stored in the measurement database by applying a first model scheme; storing the computed online model parameters of the system in a model database of the data processing device; filtering, by the data processing device, the sensor data stored in the sensor database; forwarding the filtered sensor data from the data processing device to an data analyzing device; receiving, by the data processing device, further model parameters sent from the data analyzing device; storing the received further model parameters in the model database of the data processing device; and processing, by a data processing device, measured sensor data based on the model parameters stored in the model database.

The present disclosure is based on the fact that locally distributed devices in an intelligent industrial control system may have limited computational resources. Accordingly, machine learning such as computing or improving a data model for processing sensor data on local devices is limited. Furthermore, the use of computational resources, for instance the computational resources of a cloud computing system, requires transferring a huge amount of data between the local devices and the cloud computing system.

Starting from this fact, the present disclosure tries to improve machine learning by optimizing a system model in the local distributed devices by a trade-off of a local computation of parameters for the system model in the local devices and a reduced transfer of data to an external computation system providing huge computational resources. Accordingly, the system model in the local devices may be improved almost in real time with the limited computational resources of the local devices. In addition, improved machine learning may be performed by computing an enhanced system model on an external device like a cloud computing system. For this purpose, relevant data of the local devices are transmitted from the local devices to the cloud computing system. By limiting the transmitted data, the required data transmission may be minimized and accordingly, the load of a communication network may be reduced.

The sensor data which are stored in the sensor database may be provided by a number of sensors, (e.g., one or more sensors). For example, the sensors may be any kind of sensors. For example, the sensor may measure a temperature, humidity, pressure, force, acceleration, direction, speed, flow, or any other parameter which may be sensed by a sensor. It is understood that the sensor may provide its measurement results by digital data or by an analogue signal. If the signal is provided in an analogue form, the analogue signal may be converted to a digital signal by an analogue to digital converter. Furthermore, it may be possible to apply a further processing on the measured sensor data. For example, the measured sensor data may be scaled, limited to a predetermined range, filtered, etc. The measured sensor data may be received, for example, by a sensor data interface. Accordingly, the sensors and the sensor database may be communicatively coupled by an appropriate communication line, for example a network like a bus system, especially an industrial bus system, an Ethernet network or any other appropriate communication network. The sensor interface may receive the sensor data and forward the received sensor data to the sensor database and/or any other related device, e.g., a controller which performs a control based on the received sensor data.

The controller may receive the measured sensor data and process the sensor data for a control of a related system. For example, the related system may be an industrial system like a gas turbine or any other system which may be controlled based on the received sensor data. The controller may use a numerical model of the system in order to analyze the measured sensor data. For example, the controller may apply the measured sensor data to the model of the system to compute predictions of the system. Further, it may be also possible to compute one or more parameters for controlling the system by applying the measured sensor data to the model of the system.

For intelligent industrial systems, the model of the system may be automatically improved over the time. For this purpose, the measured sensor data may be stored in the sensor database and the stored measured sensor data may be analyzed by the model generator in order to generate a model of the system or to improve an already existing model of the system. For example, the model of the system may be characterized by a number of sensors, (e.g., one or more parameters). In this case, the model generator may compute or adapt the respective parameters in order to further improve the model of the system. For this purpose, any appropriate algorithm (e.g., machine learning algorithm) may be based on using artificial intelligence. However, it is understood, that any other method for computing or adapting the model parameters may be possible, too.

Because the computational resources of the model generator in a locally distributed device may be limited, the respective algorithms for computing the model parameters may be very simple. Furthermore, only a small number of measured sensor data may be taken into account for computing the model parameters. In other words, the scheme for computing the model parameters in the local device applies a computation of the model parameters based on small computational resources. For example, only sensor data of a limited time period, or a limited number of measured sensor data may be taken into account. Furthermore, it may be possible to limit the computation of the model parameters in the local device only to particular measured sensor data. For this purpose, only sensor data fulfilling predetermined conditions, like, e.g., a predetermined deviation, a predetermined range or any other predetermined characteristic may be taken into account. However, it is understood that any other scheme for selecting the measured sensor data which are used for computing the model parameters may be possible, too.

The model generator in the local device may compute a so-called online model and store the computed online model or the parameters characterizing the respective online model in the model database. Accordingly, the controller may refer to the model parameters stored in the model database and apply a model of the system based on the model parameters stored in the model database for processing the measured sensor data. In this way, it is possible to continuously adapt the parameters of the system model based on the measured sensor data. However, due to the limited computational resources in the local device, the quality of the computed model parameters may be limited. Thus, to further improve the model of the system, especially the parameters for characterizing the model of the system, a further model may be computed by an external device having enlarged computational resources. For example, such an external device may be located in a cloud or a datacenter.

Accordingly, the measured sensor data have to be sent from the local device to the external device, and the result of the computation of the enhanced model may be transferred back from the external device to the local device. To limit the amount of data which has to be transferred between the local device and the external device, a data filter filters the sensor data and only forwards relevant sensor data from the local device to the external device. For this purpose, any predetermined filtering scheme may be applied. Moreover, it may be also possible to forward all measured sensor data from the local device to the external device. However, to limit the amount of data, the data filter may assess the measured sensor data and identify the sensor data which may be relevant for computing or enhancing the model of the system. For example, the data filter may only send data to the external device if a value of the sensor data is different from the value of previously obtained sensor data. Furthermore, it may be also possible to forward the sensor data only if the difference between the current sensor data and the previously measured sensor data exceeds a predetermined threshold value. However, any other scheme for selecting/filtering the sensor data, which are to be forwarded to the external device may be possible, too. For example, it may be also possible to determine, whether or not the respective sensor data may lead to a modified model parameter when using the respective sensor data for computing the model parameters based on the model scheme used in the model generator of the local device. If the respective sensor data will not lead to a change of the model parameters in the online model computed in the local device, the respective sensor data may be also not forwarded to the external device. Furthermore, the respective sensor data may be also deleted in the sensor database of the local device.

The external device may receive the sensor data forwarded by the local device and store the received sensor data in a further sensor database. Accordingly, the sensor data in the further sensor database may correspond to the sensor data in the sensor database of the local device. In this way, the external device, (e.g., in a cloud or a datacenter), may be in the position to compute the online model parameters computed by the local device by applying a same scheme for computing the model parameters as used in the local device. Furthermore, the external device may apply a further scheme for computing an enhanced system model. For this purpose, enlarged computational resources may be used. Hence, the accuracy of the system model by applying the second scheme for computing the system model, especially the parameters of the system model may be improved. If the external device recognizes that there is a difference, (e.g., a significant difference exceeding a predetermined threshold), the external device may send the respective model parameters of the enhanced system model to the local device. Accordingly, the local device may receive the enhanced model parameters and replace or add the enhanced parameters of the system model in the model database of the local device.

Accordingly, the present disclosure may achieve online machine learning by computing parameters of a system model locally in the device. Furthermore, an enhanced system model may be computed by huge computational resources of a cloud or a datacenter. Hence, the local device may use a model of the system which is based on intelligent machine learning algorithms without the need of huge an expensive computational resources in the local device.

In a possible embodiment, the date filter filters the sensor data having a predetermined impact on the computation on the model parameters by the model generator. By taking into account the impact of the respective sensor data on the result of the model parameters, it may be easily determined whether or not the respective sensor data may be relevant for computing the model parameters. Accordingly, the amount of data which is transferred between the local device and the external device may be further reduced. Especially, it may be determined whether the model parameters have been changed, or whether a mathematical difference between previous model parameters and the model parameters which are computed by the respective sensor data exceeds a predetermined threshold value. The mathematical difference may be computed by any mathematical distance measure, e.g., it may be determined whether a difference between the first model parameters and the second model parameters is greater than a predetermined threshold. Further, it may be possible to determine whether a difference of calculated values, when applying the model parameters of historical data from the sensor database, is greater than a predetermined value in a mathematical norm. Furthermore, it may be also possible to determine if the result of a model function by applying the respective model parameters changes more than a predetermined threshold.

In a possible embodiment the model generator is configured to notify the data filter if the computed model parameters are different from the model parameters stored in the model database. In this way, the data filter may easily recognize whether or not the respective sensor data shall be forwarded to the external data analyzing device.

In a possible embodiment, the data filter is configured to delete sensor data in the sensor database based on a predetermined deletion strategy.

In a possible embodiment, the deletion strategy may include identifying one or more of: sensor data of an uncompleted computation of model data, sensor data exceeding a predetermined aging, (e.g., the sensor data have been determined before a predetermined point of time), sensor data having an impact to the computation of the model data which is lower than a predetermined threshold value, or sensor data having a value outside a predetermined value range.

By deleting the respective sensor data in the sensor database, the amount of data which are taken into account for computing the model parameters in the data processing device may be limited. Furthermore, the external data analyzing device may be also informed about the deletion of the sensor data in the sensor database of the data processing device. Accordingly, the sensor database in the data analyzing device may be adapted accordingly, by also deleting the respective sensor data.

In a possible embodiment of the data analyzing device, the first model scheme which is applied by the first model generator corresponds to the model scheme which is applied by the model generator of the data processing device. Accordingly, the data processing device and the data analyzing device both apply the same scheme and accordingly, the data analyzing device knows the model parameters which are used in the data processing device without the need that the respective model parameters have to be transferred between the data processing device and the data analyzing device.

In a possible embodiment, the second model generator performs the computation of the second model parameters with predetermined time intervals or each time a predetermined number of sensor data are received by the receiver of the data analyzing device. By limiting the computation of the second model parameters to a predetermined condition, the computational load of the data analyzing device for computing the second model parameters may be also limited.

In a possible embodiment, the computational load of the computing the second model parameters is greater than the computational load for computing the first model parameters. Accordingly, the scheme for computing the second model parameters may be more complex, and thus more precise. Hence, the second model parameters provide a more detailed specification of the system model. On the other hand, because the scheme for computing the model parameters applied in the data processing device is small, only small computational resources are required for the model generator of the data processing device.

In a possible embodiment, the data analyzing device sends the second model parameters to the data processing device only if a predetermined condition is fulfilled. The predetermined condition may include comparing the mathematical difference between the replicated model parameters in the model database of the data analyzing device and the enhanced model parameters, which are computed based on the second model scheme. Furthermore, the predetermined condition may include computing a mathematical difference of the model functions using the respective model parameters.

In a possible embodiment of the method, the filtering act of the sensor data may include identifying sensor data having an impact to the computation of the online model data.

In a possible embodiment of the method, the method may further include an act of deleting sensor data in the sensor database of the data processing device and/or the data analyzing device. For example, sensor data fulfilling a predetermined condition may be deleted.

BRIEF DESCRIPTION OF THE DRAWINGS

For a more complete understanding of the present disclosure and advantages thereof, reference is now made to the following description taking in conjunction with the accompanying drawings. The disclosure is explained in more detail below using exemplary embodiments which are specified in the schematic figures of the drawings, in which:

FIG. 2 depicts a flow diagram of an embodiment of a method for processing data.

Figure 1:
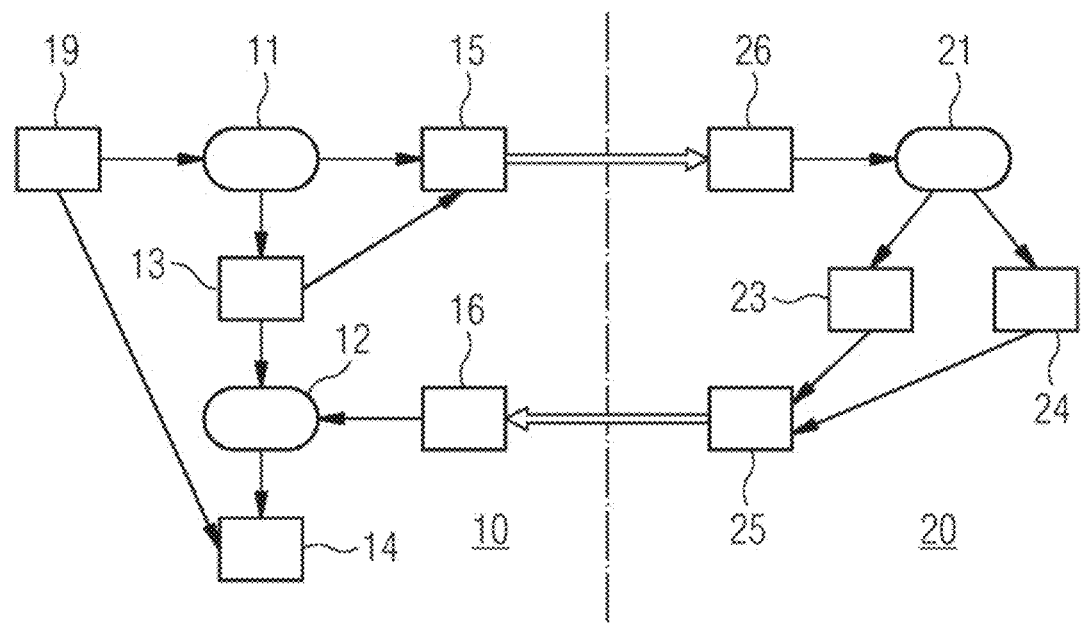
FIG. 1 depicts a block diagram of an embodiment of a data processing system.

The appended drawings are intended to provide further understanding of the embodiments. The illustrated embodiments and, in conjunction with the description, help to explain principles and concepts of the disclosure. Other embodiments and many other advantages mentioned become apparent in view of the drawings.

DETAILED DESCRIPTION OF THE DRAWINGS

FIG. 1 shows a schematic block diagram of a data processing system according to an embodiment. The data processing system includes a data processing device 10, in the following denoted as edge device 10, and a data analyzing device 20, in the following denoted as cloud or datacenter 20. The edge device includes a number of sensors 19, (e.g., one or more sensors), a sensor database 11, a model database 12, a model generator 13, controller 14, a data filter 15, and a receiver 16. The datacenter 20 includes a sensor database 21, a first model generator 23, a second model generator 24, a data analyzer 25, and a receiver 26.

Accordingly, one or more sensors 19 may measure values relating to sensed parameters and provide corresponding sensor data. For example, a sensor 19 may measure an environmental parameter, a state or another parameter related to a system, (e.g., an industrial system). For instance, a sensor 19 may measure a temperature, a humidity, a pressure, a speed, an acceleration, a direction, an intensity, a volume flow, a position, an angle, or any other parameter which may be sensed. Accordingly, a value corresponding to the sensed parameter may be directly provided by a digital value. Alternatively, the sensed parameter may be provided as an analogue signal and converted to a digital signal by an analogue to digital converter. Furthermore, any other processing of the sensed parameters, (e.g., a filtering, averaging over a predetermined time period, etc.), may also be performed. For example, the sensed measurements may be provided by a digital connection or a network like an Ethernet network, an industrial bus system, etc. For example, the sensed measurements may be provided as sensor data and received by a sensor interface (not illustrated). For example, the sensor interface may receive the sensor data and forward the sensor data to the sensor database 11 and/or the processor 14 (or controller) of the edge device 10. For example, the sensor interface may also buffer the sensor data or perform any other operation with the sensor data.

The measured sensor data may be provided to the processor 14. Accordingly, processor 14 may process the measured sensor data in order to allow a control of a related system. For example, the controller 14 may use a system model like a numerical model of a related system in order to analyze and process the sensor data provided by a sensor 19. For example, the controller 14 may compute a prediction or estimation of one or more predetermined characterizing parameters of the system which is to be controlled based on the measured sensor data in association with a related system model. For this purpose, the controller 14 may refer to model parameters stored in a model database 12. For example, the model parameters stored in the model database 12 may specify the parameters of a model function describing the related system which shall be controlled. In an example, the system to be controlled may be a gas turbine, and the related model may be a model which describes the temperature characteristics of this gas turbine. Accordingly, a prediction of the temperature behavior of the gas turbine may be determined based on the measured sensor data and the related model. However, it is understood that the present disclosure may be also applied to any other system, e.g., any other industrial system, which may be modeled accordingly.

The model for characterizing the related system or at least one or more characterizing parameters of the system may be any appropriate system. For example, the model may be in a very simple case a function, (for example, a linear function, a function with multiple coefficients, etc.), describing the properties of the system in connection with the measured sensor data. In an example, the model may describe a correlation between one or more measured sensor data, (e.g., a pressure, rotational speed, etc.), and an associated development of a temperature. However, it is understood that any other modeling of characteristic parameters of a system depending on measured sensor data may be also possible. For example, the model of the system may be adapted during the lifetime of the system. For example, the model of the system may be adapted by a machine learning algorithm or the like. For example, a predetermined function may be used which may be adapted by modifying one or more parameters of the related model function. However, any other scheme for modeling the related system may be also possible.

The model of the system, (e.g., the parameters of such a model), may be regularly or continuously adapted. For this purpose, the measured sensor data may be analyzed and the parameters for specifying the related model may be computed based on previously measured sensor data. For this purpose, the measured sensor data provided by the sensors 19 may be locally stored in a sensor database 11 of the edge device 10. In order to limit the amount of data which is stored in the sensor database 11 of the edge device 10, it may be possible to limit the data to the data of a predetermined time period, or to a predetermined number of sensor data. However, any other scheme for limiting the sensor data stored in the sensor database 11 may be also possible.

A model generator 13 of the edge device 10 may read the sensor data stored in sensor database 11. Based on the sensor data stored in the sensor database 11, the model generator 13 may compute model parameters of the system model. For example, a particular first model scheme may be used for computing the model parameters of the system by the model generator 13. Because the computational resources of the edge device 10, (e.g., the model generator 13), are limited, the model generator 13 may apply only a simple scheme for computing the model parameters, wherein the scheme requires only small computational resources like CPU load, memory, etc. The computed parameters of the model may be stored in the model database 12 of the edge device 10. In this way, the edge device 10 may compute parameters for the system model directly in the edge device 10 without the need of any external resources. Hence, the respective model parameters are immediately available. For example, the computation of the model parameters may be continuously performed. Thus, the model parameters may be adapted almost in real-time. Furthermore, it may be also possible to initiate the computation of the model parameters by the model generator 13 based on predetermined conditions. For example, a further computation of model parameters by the model generator 13 may be initiated upon predetermined condition is met. For example, the predetermined condition may be a reception of a predetermined number of new measured sensor data, a reception of measured sensor data fulfilling a predetermined condition, for example, a measured sensor data exceeding a predetermined value, etc. However, it is understood that any other condition for initiating a computation of model parameters may be also applied.

When computing the model parameters by a model generator 13, it may be possible to determine whether or not a particular sensor data has an impact to the computed model parameters. For example, it may be determined that the computed model parameters are the same or almost the same as the previously computed model parameters, even though further sensor data have been stored in the sensor database 11 and the further sensor data are also used for computing the model parameters. If it is detected that the newly added sensor data do not have any impact to the computed model parameters, such sensor data may be deleted in the sensor database 11. Furthermore, a data filter 15 may be informed about the impact of the sensor data to the computation of the model parameters.

The data filter 15 may analyze the sensor data stored in the sensor database 11 in order to determine whether the respective sensor data may be forwarded to the datacenter 20. For this purpose, any appropriate scheme for filtering or analyzing the data stored in the sensor database 11 may be applied. For example, the data filter 15 may only send the sensor data to the datacenter 20 if the respective sensor data are relevant for the computation of the model parameters by the model generator 13 of the edge device 10. If the model generator 13 does not use the respective sensor data stored in the sensor database 11 of the edge device 10, such sensor data are not sent to the datacenter 20 by the data filter 15. Furthermore, the data filter 15 may also not send such sensor data to the edge device 20 which do not have any impact on the model parameters when computing the model parameters by the model generator 13 of the edge device 10. However, it is understood that any other or further scheme for selecting the sensor data which shall be send from the edge device 10 to the datacenter 20 may be also possible. For example, the data filter 15 may send all sensor data of the sensor database 11 to the edge device 20 which are required for obtaining the model parameters computed by a model generator 13.

The following description refers to the datacenter 20. A receiver 26 of the data center 20 receives the sensor data sent by the data filter 15 of the edge device 10. Further, the receiver 26 forwards the received sensor data to the sensor data base 21 of the datacenter 20. Because the data filter 15 forwards all sensor data which are required for obtaining the model parameters computed by the model generator 13 of the edge device 10, the sensor database 21 of the datacenter 20 also include all the relevant sensor data for computing these model parameters. Accordingly, the first model generator 23 of the datacenter 20 is in the position to compute the same model parameters as computed by the model generator 13 of the edge device. For this purpose, the model generator 23 of the data center 20 applies the same model scheme as used by the model generator 13 of the edge device 10. Further to this, the datacenter 20 may compute an enhanced model of the related system by a second model generator 24. Because the datacenter 20 includes huge computational resources, the second model generator 24 may apply a more complex scheme for computing model parameters. For example, a larger number of sensor data may be used and/or a more complex scheme for computing the model parameters may be applied to the sensor data to compute the respective model parameters. Accordingly, a more detailed and precise modeling of the system may be achieved based on the enhanced model parameters computed by the second model generator 24 of the datacenter 20.

In order to minimize the computational load of the data center 20, the computation of the enhanced model parameters by the second model generator 24 may be limited to predetermined conditions. For example, the computation of the enhanced model parameters may be performed at predetermined time intervals, (e.g., once per minute, once per hour, once per day, etc.). Furthermore, the computation of the enhanced model parameters by the second model generator 24 may be also initiated upon receiving a predetermined number of new sensor data. However, it is understood that any other criteria for initiating a computation of the enhanced model parameters by the second model generator 24 may be also applied.

After the second model generator 24 has computed enhanced model parameters, the enhanced model parameters may be compared with the model parameters computed by the first model generator 23 of the datacenter 20. As already mentioned above, the model parameters computed by the first model generator 23 correspond to the model parameters computed in the edge device 10. If the enhanced model parameters computed by the second model generator 24 are different from the model parameters computed by the first model generator 23, the data analyzer 25 may send the enhanced model parameters to the edge device 10. For this purpose, the data analyzer 25 may compare the enhanced model parameters computed by the second model generator 24 with the model parameters computed by the first model generator 23. Alternatively, it may be also possible to compute the result of a model function applying the enhanced model parameters and the model parameters computed by the first model generator 23, and to compare the result of the respective functions. If the result exceeds a predetermined threshold value, the enhanced model parameters may be sent to the edge device 10. Accordingly, it is only necessary to send the enhanced model parameters from the datacenter 20 to the edge device 10 if the enhanced model parameters are different from the model parameters computed by the first generator 23, which correspond to the model parameters already stored in the model database 12 of the edge device 10. Accordingly, an unnecessary transfer of data may be avoided.

The edge device 10 may receive the enhanced model parameters from the data center 20 by the receiver 16. Accordingly, the receiver 16 may store the received enhanced model parameters in the model database 10 of the edge device 10. The received enhanced model parameters may be stored in addition to the model parameters computed by the model generator 13 of the edge device. Alternatively, the received enhanced model parameters may replace all the model parameters previously stored in the model database 13 of the edge device 10.

FIG. 2 shows a flow diagram of a method for processing data underlying an embodiment. The features of the method in FIG. 2 correspond to the feature performed by the components of the data processing system as already described in association with this FIG. 1. Hence, all operations described above in connection with the data processing system may be also performed by the method as described in the following, and accordingly, all acts performed by the following method may be also executed by the data processing system described above. For sake of clarity, reference numerals mentioned above in connection with FIG. 1 will be maintained for the following description of the method.

In act S1, sensor data are measured, e.g., by one or more sensors 19. In act S2, the method sensor data are stored in a sensor database 11 of the edge device 10. In act S3, the edge device 10, (e.g., the model generator 13 of the edge device 10), computes online model parameters of a system model. The online model parameters are computed based on the sensor data stored in the measurement database 11 of the edge device 10 by applying a first model scheme. In act S4, the computed online model parameters of the system are stored in a model database 12 of the edge device 10. In act S5, the sensor data stored in the sensor database 11 of the edge device 10 are filtered by the edge device 10, e.g., by data filter 15 of the edge device 10. In act S6, the filtered sensor data are forwarded from the edge device 10 to the datacenter 20. In act S7, further model parameters from the datacenter 20 are received by the edge device 10, e.g., by receiver 16 of the edge device 10. In act S8, the received further model parameters are stored in a model database 12 of the edge device 10. In act S9, the measured sensor data are processed based on the model parameters stored in the model database 12 of the edge device 10.

The method may further include the acts of receiving the forwarded filtered sensor data by the edge device 20, storing the forwarded filtered sensor data in a further model database 21 of the edge device 20, computing replicated model parameters corresponding to the online model parameters in the edge device 10, computing further model parameters based on a second model scheme in the datacenter 20, and sending the second model parameters from the datacenter 20 to the edge device 10 if a mathematical difference between the replicated model parameters and the further model parameters is greater than a predetermined threshold.

In certain examples, the method may send the further model parameters to the edge device 10 if a mathematical difference between the replicated model parameters and the further model parameters exceeds a predetermined threshold and/or a difference of a model function using the replicated model parameters and the model function using the further model parameters exceeds a predetermined threshold.

The filtering of the sensor data in the edge device 10 may include identifying sensor data having an impact to the computation of the online data model. Accordingly, sensor data which do not have any impact to the parameters of the online model data are filtered out and not forwarded to the datacenter 20.

The method may further include deleting sensor data in the sensor database 11 of the edge device 10 for the sensor database 21 of the data center 20 if a predetermined condition is fulfilled.

Summarizing, the present disclosure relates to an enhanced computation of a data model for an intelligent data processing device. The data processing device may be a device having limited computational resources. Accordingly, a system model for processing the data is computed in the local device. Additionally, an enhanced model may be computed in a remote device like a cloud or a data center. For this purpose, the cloud or datacenter is provided with filtered data for computing an enhanced model. The cloud or datacenter may compute an enhanced model and forward the respective model to the local device if the enhanced model is better than the model locally generated.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

Although the disclosure has been illustrated and described in greater detail by way of the exemplary embodiments, the disclosure is not restricted by way of the disclosed examples, and other variations may be derived therefrom by a person skilled in the art, without departing from the scope of protection of the disclosure.

The invention claimed is:

1. A data processing device comprising:
a sensor database configured to store sensor data measured by a number of sensors;
a model database configured to store model parameters of a system model;
a controller configured to process the sensor data measured by the number of sensors based on the model parameters stored in the model database and control a system by applying the sensor data to the system model based on the model parameters stored in the model database;
a model generator configured to calculate computed model parameters of the system model based on the sensor data stored in the sensor database by applying a first model scheme, and to store the computed model parameters of the system model in the model database;
a data filter configured to filter the sensor data stored in the sensor database and forward the filtered sensor data, via a communication network, to an external data analyzing device configured to compute first model parameters by applying the same first model scheme as the data processing device and compute enhanced, second model parameters by applying a second model scheme using the filtered sensor data provided by the data filter to the external data analyzing device, wherein the filtered sensor data represents only a portion of the sensor data required to calculate the first model parameters and the second model parameters; and
a receiver configured to receive, via the communication network, the enhanced, second model parameters computed by the external data analyzing device, following a recognized difference by the external data analyzing device between the enhanced, second model parameters and the first model parameters being greater than a predetermined threshold, wherein the model database is further configured to store the enhanced, second model parameters, wherein the data processing device is an individual local device that is separate from and in communication with the external data analyzing device via the communication network, wherein the external data analyzing device is located within a cloud computing system, wherein the second model scheme is a more complex scheme than the first model scheme to calculate the enhanced, second model parameters, and wherein the external data analyzing device comprises larger computational resources than the data processing device to compute the enhanced, second model parameters.

2. The data processing device of claim 1, wherein the data filter is configured to filter the sensor data having predetermined impact on the computation of the computed model parameters by the model generator.

3. The data processing device of claim 1, wherein the model generator is configured to notify the data filter based on the computed model parameters being different from the model parameters stored in the model database.

4. The data processing device of claim 1, wherein the data filter is configured to delete sensor data in the sensor database based on a predetermined deletion strategy.

5. The data processing device of claim 4, wherein the deletion strategy comprises identifying one or more of: sensor data of an uncompleted computation of computed model parameters, sensor data exceeding a predetermined aging, sensor data having an impact to the computation of the model data being lower than a predetermined threshold value, or sensor data outside a predetermined value range.

6. A data analyzing device within a cloud computing system, the data analyzing device comprising:
- a receiver configured to receive, via a communication network, sensor data from an external data processing device separate from the data analyzing device and the cloud computing system;
- a sensor database configured to store the sensor data;
- a first model generator configured to compute first model parameters of a system model based on the sensor data stored in the sensor database by applying a first model scheme, wherein the first model scheme applied by the first model generator is a same model scheme that is applied by a model generator of the external data processing device;
- a second model generator configured to compute enhanced, second model parameters of the system model based on the sensor data stored in the sensor database by applying a second model scheme, wherein a computational load for computing the enhanced, second model parameters is greater than the computational load for computing the first model parameters to reflect larger computational resources for the data analyzing device in comparison to the external data processing device, and wherein the second model scheme is a more complex scheme than the first model scheme to calculate the enhanced, second model parameters; and
- a data analyzer configured to compare the first model parameters with the enhanced, second model parameters and to send the enhanced, second model parameters to the external data processing device based on a mathematical difference between the first model parameters and the enhanced, second model parameters being greater than a predetermined threshold.

7. The data analyzing device of claim 6, wherein the second model generator is configured to perform the computation of the enhanced, second model parameters with predetermined time intervals, or each time a predetermined number of sensor data are received by the receiver.

8. A data processing system comprising:
- a data processing device comprising:
  - a sensor database configured to store sensor data measured by a number of sensors;
  - a model database configured to store model parameters of a system model;
  - a controller configured to process the sensor data measured by the number of sensors based on the model parameters stored in the model database for controlling a system by applying the sensor data to the system model based on the model parameters stored in the model database;
  - a model generator configured to calculate computed model parameters of the system model based on the sensor data stored in the sensor database by applying a first model scheme, and to store the computed model parameters of the system model in the model database;
  - a data filter configured to filter the sensor data stored in the sensor database, wherein the data filter is configured to forward, via a communication network, the filtered sensor data to a data analyzing device that is a separate device from the data processing device; and
  - a receiver configured to receive, via the communication network, enhanced, second model parameters computed by the data analyzing device using the filtered sensor data provided by the data filter to the data analyzing device, and to store the received enhanced, second model parameters in the model database; and
- the data analyzing device comprising:
  - a receiver configured to receive the filtered sensor data from the data processing device;
  - a sensor database configured to store the filtered sensor data;
  - a first model generator configured to compute first model parameters of a system model based on the filtered sensor data stored in the sensor database by applying the same first model scheme as the data processing device;
  - a second model generator configured to compute the enhanced, second model parameters of the system model based on the filtered sensor data stored in the sensor database by applying a second model scheme different from the first model scheme; and
  - a data analyzer configured to compare the first model parameters with the enhanced, second model parameters and to send the enhanced, second model parameters to the data processing device based on a recognized mathematical difference between the first model parameters and the enhanced, second model parameters being greater than a predetermined threshold, wherein the data processing device is an individual local device that is separate from and in communication with the data analyzing device via the communication network, wherein the data analyzing device is located within a cloud computing system, wherein the filtered sensor data represents only a portion of the sensor data required to calculate the first model parameters and the second model parameters, wherein the second model scheme is a more complex scheme than the first model scheme to calculate the enhanced, second model parameters, and wherein the data analyzing device comprises larger computational resources than the data processing device to compute the enhanced, second model parameters.

9. A method for processing data comprising:

measuring sensor data by at least one sensor of an individual data processing device;

storing the sensor data in a sensor database of the data processing device;

computing, by the data processing device, model parameters of a system model based on the sensor data stored in the sensor database by applying a first model scheme;

storing the computed model parameters of the system model in a model database of the data processing device;

filtering, by the data processing device, the sensor data stored in the sensor database;

forwarding, by the data processing device, the filtered sensor data to an external data analyzing device via a communication network, wherein the data processing device is an individual local device that is separate from and in communication with the external data analyzing device via the communication network, wherein the external data analyzing device is located within a cloud computing system, wherein the external data analyzing device is configured to compute first model parameters by applying the same first model scheme as the data processing device and compute enhanced, second model parameters by applying a second model scheme using the filtered sensor data provided by a data filter to the external data analyzing device, and wherein the filtered sensor data represents only a portion of the sensor data required to calculate the first model parameters and the enhanced, second model parameters;

receiving, by the data processing device, enhanced, second model parameters sent from the external data analyzing device via the communication network, following a recognized mathematical difference by the data processing device between the enhanced, second model parameters and the first model parameters being greater than a predetermined threshold;

storing the enhanced, second model parameters in the model database of the data processing device; and processing, by the data processing device, the sensor data based on the enhanced, second model parameters stored in the model database for controlling a system by applying the sensor data to the system model based on the enhanced, second model parameters stored in the model database.

10. The method of claim 9, further comprising:

receiving, by the external data analyzing device, the forwarded filtered sensor data;

storing the forwarded filtered sensor data in a further model database of the external data analyzing device;

computing, by the external data analyzing device, the first model parameters corresponding to the computed model parameters by applying the same first model scheme as the data processing device;

computing, by the external data analyzing device, the enhanced, second model parameters based on the second model scheme, wherein the second model scheme is a more complex scheme than the first model scheme; and sending the enhanced, second model parameters from the external data analyzing device to the data processing device based on the recognized mathematical difference between the first model parameters and the enhanced, second model parameters being greater than the predetermined threshold.

11. The method of claim 9, wherein the filtering of the sensor data comprises determining whether the computed model parameters are the same or almost the same as previously computed model parameters, when further sensor data have been stored in sensor database and the further sensor data are also used for calculating the computed model parameters.

12. The method of claim 9, further comprising:

deleting sensor data in the sensor database of the data processing device and/or the external data analyzing device when a predetermined condition is fulfilled.

13. The data processing device of claim 1, wherein the data processing device is an edge device.

* * * * *